March 7, 1933.  S. P. BURKE  1,900,223
METHOD OF FIRING REHEATING FURNACES
Filed Jan. 29, 1930  2 Sheets-Sheet 1
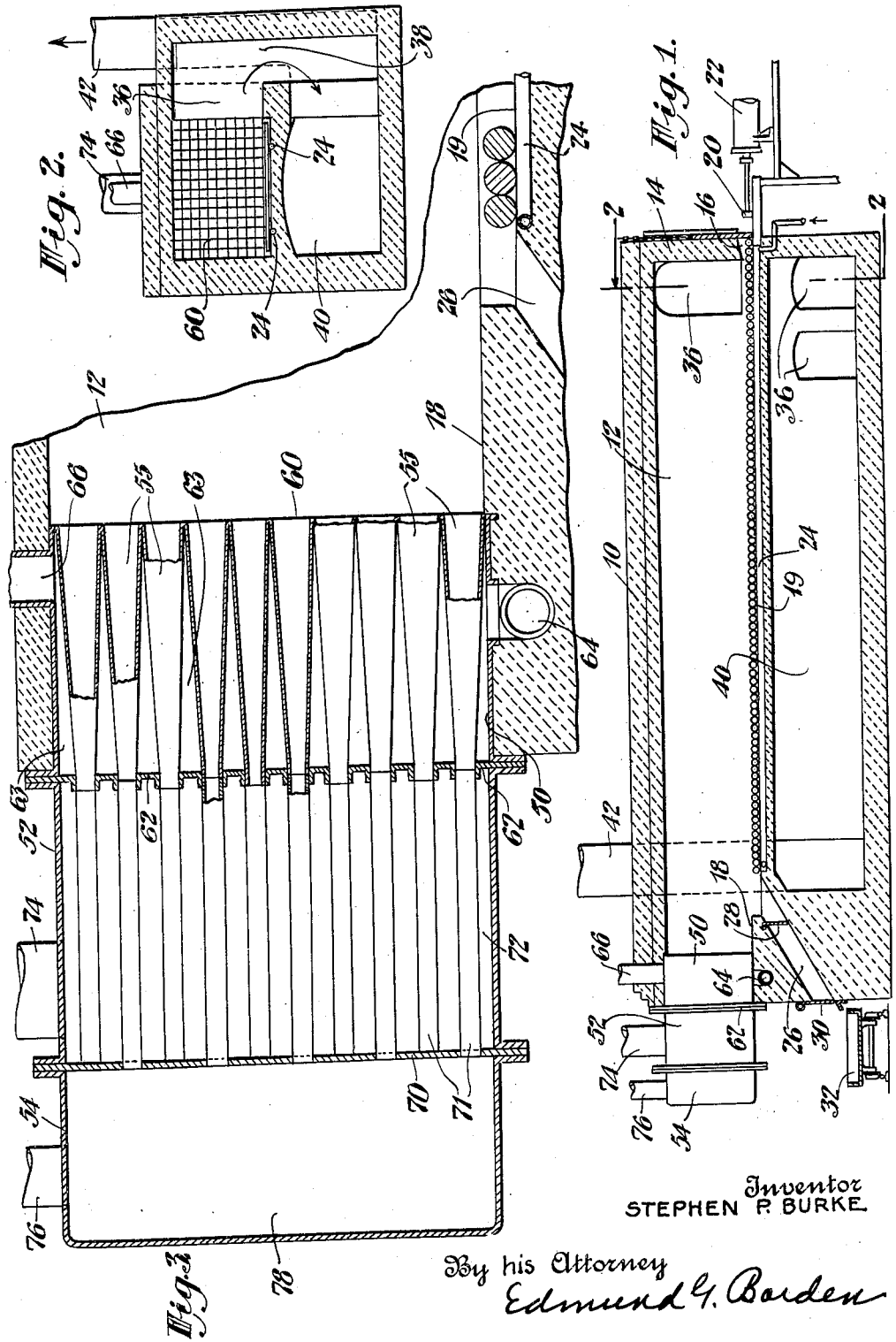
Inventor
STEPHEN P. BURKE
By his Attorney
Edmund G. Borden March 7, 1933.    S. P. BURKE    1,900,223
METHOD OF FIRING REHEATING FURNACES
Filed Jan. 29, 1930    2 Sheets-Sheet 2
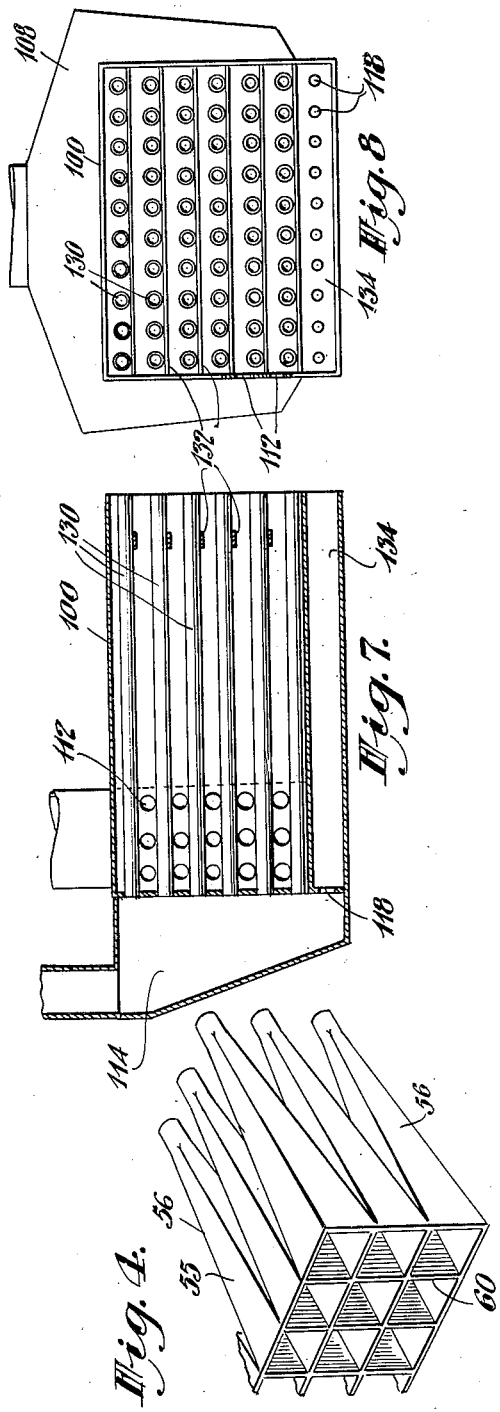
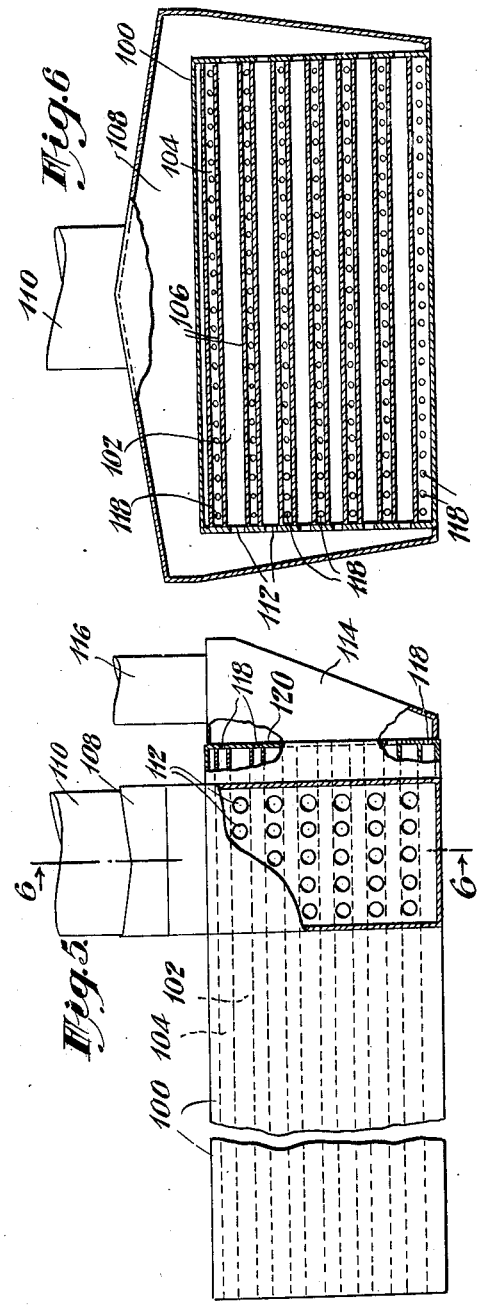
Inventor
STEPHEN P. BURKE
By his Attorney
Edmund G. Barden Patented Mar. 7, 1933

1,900,223

UNITED STATES PATENT OFFICE

STEPHEN P. BURKE, OF ELIZABETH, NEW JERSEY, ASSIGNOR TO SURFACE COMBUSTION CORPORATION, OF TOLEDO, OHIO, A CORPORATION OF NEW YORK

METHOD OF FIRING REHEATING FURNACES

Application filed January 29, 1930. Serial No. 424,280.

This invention relates to industrial high temperature heating and heat treating operations, and more especially it concerns methods and apparatus for combusting fuel gas employed in such operations. The invention has special utility in connection with the heating of steel but is not limited in its application to such material.

In heating operations where a gaseous fluid is used, the air and gas are generally premixed, and the mixture is then introduced into the furnace. Such mixtures burn very rapidly and produce maximum temperature in close proximity to the point of introduction of the mixture into the furnace, often resulting in injury to the refractory lining of the furnace at that point. Moreover, such mixtures produce a substantially non-luminous flame which transfers its heat to the work partly by direct contact therewith and partly by conduction and convection to the furnace walls thus rendering the latter incandescent, such heat then being radiated to the material, and to a small degree also by direct radiation from the gases to the work being heated.

Steel when heated to high temperatures in an atmosphere of products of combustion, is invariably oxidized or scaled notwithstanding that the fuel may have been burned with a deficiency of air thus producing a so-called reducing atmosphere, scaling not being entirely prevented, for the reason that the carbon dioxide and water vapor formed during the process of combustion attack the metal regardless of such deficiency of air.

In certain instances, raw gas has been introduced into the furnace for the purpose of maintaining a reducing atmosphere but the gas quickly mixes with the products of combustion, and the resulting atmosphere has substantially the same effect as when the combustible mixture itself contains a deficiency of air.

The invention has among its objects to provide an improved method of combusting fuel gas and air whereby maximum heating efficiency may be obtained and to provide a method of protecting easily oxidized materials such as steel during heating from oxidation. Other objects will more fully appear hereinafter.

According to the present invention the combustible constituents, i. e.—fuel gas and air—are introduced at one end of a combustion chamber in individual, contiguous streams all moving in a common direction at such relative velocities as to avoid substantial turbulence. The said streams of gas and air may enter the chamber either in parallel slots, or in parallel or concentric tubular ducts, and the velocities of the respective gas and air streams are preferably substantially equal as they enter the furnace, although this is not necessary, and considerable variation may occur in the relative velocities of the gas or air streams without creating a condition of turbulence in the highly heated combustion zone. Mixing of the gas and air occurs within the furnace substantially by diffusion, so that at the various zones or surfaces of contact of the gas and air, conditions are favorable for combustion, but not elsewhere.

Within the furnace structure the entering gases are rapidly heated, and diffusion of the gases into each other adjacent their point of contact occurs slowly. As the gases flow into the combustion zone of the furnace, the flow thereof is further stabilized due to the development of internal conditions in the now highly-heated gaseous stream, facilitating viscous stream-line flow of the components thereof. When hydrocarbons or any other gas capable of setting free carbon are present in the fuel gas layers, the high temperature developed as combustion proceeds, causes a cracking or decomposition of portions of the hydrocarbons, resulting in the liberation of finely divided incandescent carbon particles which travel along within a viscous gaseous envelope of hot combustion gases. The setting up of conditions of viscous stream-line flow at the boundaries of each of the adjacent gas and air streams retards the further interdiffusion of gas and air so as to materially retard the combustion and permit the same to occur throughout a desired portion of the length of the furnace. The zone of combustion may be made substantially coextensive with the moving bodies of gas and air within the combustion chamber by suitable adjustment of the thickness of the layers of gas and air used; and such bodies will be highly luminous due to the incandescent carbon in suspension therein. A major portion of the heat required for bringing the work to the desired temperature consists of heat radiated directly from the luminous flame, additional heat being reradiated to the metal from the incandescent furnace walls and otherwise transferred to the work by direct contact of the hot gases.

Since the fuel gas, air and products of combustion pass through the length of the furnace without objectionable turbulence and substantially in stream-line flow, due to the setting up of conditions of viscous flow at and near the various surfaces of contact of the layers of air and fuel gas as they become highly heated, it is possible to effectively regulate the character of the atmosphere surrounding the material being heat treated. For example, if the lowermost duct of the fluid-introducing device is made to serve as a gas duct, the work to be treated may be made to lie within the atmosphere of this reducing gas throughout its path of travel within the furnace. Any mixing due to turbulence of the products of combustion is substantially resisted due to the viscous flow conditions established. This gas blanketing effect will be most readily obtainable at the gas entrance end of the furnace; and the duct supplying the gas blanket to the work should be of sufficient thickness to suitably protect the portion of the work remote from the gas entrance end of the furnace. By moving the work through the furnace in a direction toward the gas entrance end, any superficial surface oxidation by contact therewith of combustion gases adjacent the work charging end of the heating chamber is removed by the action of the reducing action of the protective layer of reducing fluid adjacent the said gas entrance end of the heating chamber.

The work to be heated may be supported in the furnace either immediately above or below the moving fluid body, or at one side of the latter. Where the work to be treated is steel, the layer of moving fluid in contact therewith should preferably be composed of fuel gas which would thus serve as a protective blanket between the steel and the adjacent layer of air and products of combustion as already indicated. The fuel gas layer in contact with the work should preferably be of considerably greater thickness than the other fuel gas layers elsewhere introduced, the initial thickness of each of the other gas layers being only a fraction of that of the adjacent air layers, and being progressively burned. If desired, a neutral gas such as nitrogen may be substituted for the above-mentioned layer of fuel gas for the purpose of providing the protective blanket of non-oxidizing gases for the prevention of corrosion and scaling. Furthermore, since the protective action of the gas employed will depend upon the ratio of $CO$ to $CO_2$ in the combustion gases tending to interdiffuse thereinto, $CO$ may be satisfactorily employed as the protective gas, and its use reduces the possibility of $CO_2$ diffusion through the protective gas and into contact with the work to oxidize the latter. Other reducing gases or neutral gases may be employed for this purpose.

It is also within the purview of the present invention to substitute for the protective blanket of non-oxidizing gases in contact with the work, a flowing fluid layer or blanket carrying a chemical reactant such as formaldehyde, capable of being decomposed to yield protective gases, or of entering into reaction with the highly heated work within the combustion chamber. It is however preferable to employ fuel gas which acts as a reducing agent, and is particularly adapted to be subsequently combusted in the process.

It is generally desirable that the furnace walls, roof and hearth should form a continuation of the outermost gas and air ducts of the gas introducing device or burner, and there should be no abrupt increase of cross-sectional area particularly in the portion of the length of the furnace carrying the work to be heat treated, so that stream line flow of the flames adjacent the work is facilitated. The length of the flames can be reduced, and the rate of B. t. u. liberation throughout the length of the furnace can be increased by suitably sloping the walls, roof, or hearth of the furnace, or a combination of these parts,—so as to produce a converging path of travel for the various elements of the gas stream, especially at points adjacent the fluid inlet end of the heating chamber.

While according to the preferred embodiment of the invention, contiguous fluid layers composed respectively of air and fuel gas are employed, satisfactory results may be obtained by substituting for either the layers of air or of gas,—fluid layers comprising mixtures of fuel gas and air. In the event that it is desired to maintain an oxidizing atmosphere in contact with the work being heated, a blanket of air or other oxygen-supplying gas will be maintained in contact with the work in place of one of fuel gas or neutral gas.

In the accompanying drawings, Fig. 1 is a vertical section through one form of furnace exemplifying the invention.

Fig. 2 is a transverse cross section through the furnace along the lines 2—2 of Fig. 1.

Fig. 3 is a longitudinal section through one form of diffusion flame burner assembly.

Fig. 4 is a view in perspective of certain elements of the burner shown in Fig. 3.

Fig. 5 is a side elevation of a modified form of burner construction.

Fig. 6 is a vertical section taken along the line 6—6 of Fig. 5.

Figs. 7 and 8 are respectively a longitudinal section and a transverse section through another burner construction.

Referring to the drawings, numeral 10 designates a furnace suitably lined throughout with the usual refractory material. An elongated work-receiving and heat-treating chamber 12 of substantially uniform cross section throughout its length terminates at one end in a wall 14 provided with a door-controlled opening 16, the other end of the chamber 12 terminating in a throat 18, the floor of which is preferably disposed above the floor 19 of the chamber 12 a distance approximately equal to the height of the work to be heat treated.

For introducing into the chamber 12 the material to be heated, a charging frame or device 20 is provided, the same being operated by a hydraulic cylinder or the like 22 for pushing material into and through the said chamber. A pair of work-supporting members 24, which may be formed of water-cooled rails of small diameter, support the work as it passes through the heating chamber 12. An inclined work discharging chute 26 is disposed in the furnace floor at the work discharging end of the chamber 12. A pair of spaced closing members 28, 30 in the chute 26 cooperate to permit removal of the heated work from the chamber 12 while preventing fluid flow between the furnace and the outer atmosphere. A conveying device 32 serves to remove the heated material from the outlet of the chute 26 as rapidly as it is discharged from the furnace.

For removing the products of combustion from the chamber 12 after they have served their purpose, one or more flues 36 are disposed in one or both side walls of the chamber adjacent the work-receiving end thereof. The flues 36 communicate through flue sections 38 with a horizontal flue 40 disposed below the chamber 12. The opposite end of the flue 40 is connected with a stack 42.

Referring now more particularly to the modification of the invention shown in Figs. 1 to 4,—a burner assembly is provided for burning within the furnace gaseous combustible material such as hydrocarbons under conditions which substantially prevent fluid turbulence and the formation of scale on the work,—the said burner assembly comprising three connected casing sections 50, 52, 54, forming, respectively, a cooling chamber 68, an air supply chamber 72, and a gas supply chamber 78, separated by partitions 62 and 70, and conduits for supplying the respective fluids being indicated at 64, 74 and 76, respectively.

Mounted within the casing 50 is a plurality of tubular members 55 having sloping side walls 56, the tubular members merging into each other at their larger end margins as indicated at 60, the tubes being made of heat resistant alloy. The small end of each tube 55 is supported by the partition 62 in a fluid-tight manner. It will therefore be seen that cooling fluid may circulate between the tubes, the fluid passing from the casing by way of conduit, 66. Some of the tubes 55 serve as air conducting tubes and the others as gas conducting tubes. Those tubes which are to serve as gas conducting tubes are connected with the gas supply chamber 78 by pipes 71. It is preferred that all of the lowermost row of tubes 55 serve as gas conducting tubes in order that there may be flowed over the material to be heated a layer of gas for protecting the work from oxidation. It will be noted that the tubes 55 are all of the same size as regards cross sectional area. Since a greater volume of air than gas is required for complete combustion of the gas and since in accordance with the present invention the air and gas flow with substantially equal velocities, most of the tubes 55 will serve as air conducting tubes. Thus if one volume of gas requires eight volumes of air for complete combustion then out of nine tubes 55, eight of them would be air tubes. Thus, referring to Fig. 4, it can be assumed that the middle tube is the gas conducting tube and that the other eight tubes are air conducting tubes. The gas issuing from the central tube will therefore be completely surrounded by air issuing from the adjacent tubes.

The air conduit 74 and gas conduit 76, or either of them, may if desired be connected with a suitable heat exchanger or recuperator for preheating the gas and air prior to their introduction into the burner assembly. The hot flue gases from the furnace may be employed for this preheating treatment.

Referring to the modified apparatus shown in Figs. 5 and 6, the burner assembly comprises a housing 100 adapted to fit into and completely fill the end of the furnace adjacent the throat 18. The said housing is divided into a plurality of superposed slots or compartments 102, 104, by means of a plurality of thin partitions 106 made of heat-resistant metal such as rezistal. An air header 108 surrounds the housing 100 through a portion of its length remote from the furnace and is connected through a conduit 110 with a source of air under pressure. The interior of the header 108 communicates with each of the slots 102 within the housing 100 through a plurality of apertures 112 arranged at each side of the latter. A gas distributing header 114,—in communication with a source of combustible gas under pressure through a conduit 116,—is also in communication with the slots or ducts 104 through a series of apertures 118 disposed in a partition 120 at one end of the housing 100. Suitable valves are provided in the air and gas conduits leading to the burner to provide for the independent regulation of the velocity pressure of each of these fluids. The arrangement of the apertures 112 and 118 respectively in the sides and end of the housing 100 provides for a uniform distribution of the respective fluids to the various slots or ducts 102 and 104.

According to the modification shown in Figs. 7 and 8, a plurality of parallel spaced tubes 130 of heat-resistant metal extend longitudinally of the burner casing 100, the rear ends of the tubes opening into a suitable gas manifold such as the manifold 114 of Fig. 7. These tubes are suitably supported near their forward ends in superposed horizontal rows, by means of supporting members 132 of heat resistant metal. Air or other combustion-supporting gas is introduced into the side of the burner casing adjacent the rear end thereof and around the tubes 130 by means of an air header 108 and associated parts functioning, for example, like header 108 of Figs. 6 and 7. A separate horizontal duct or slot 134 is disposed below the bottom row of gas tubes 130, the rear end thereof being in communication with gas manifold through apertures 118 in the manner shown in Fig. 7.

In practicing the present invention in accordance with the preferred form thereof, a combustible hydrocarbon-containing gas such as natural gas or coke-oven gas is flowed at a predetermined velocity and pressure into the casing 54 from whence it flows through the pipes 71 to such of the tubes 55 as are in communication with the pipes. At the same time air under suitable pressure is flowed into the casing 52 from whence it flows into such of the tubes 65 as are in communication therewith. These streams of gas and air are ignited as they flow into the furnace throat due to the high temperature prevailing therein. By suitable regulation, both gas and air streams flow at substantially the same velocity as they enter the furnace throat. Mixing of the gas and air thereafter occurs substantially by diffusion only, the combustion occurring progressively at the surfaces of the gas and air streams. The total cross-sectional area of the respective gas ducts and of the air ducts are properly selected to assist in maintaining equivelocity flow of these gases in suitable proportions for complete combustion based on the composition of the hydrocarbon gas and of the oxygen-containing gas employed and the degree of over-ventilation desired.

A somewhat over-ventilated flame, such as a 10% over-ventilated flame, is satisfactorily used in the process. Various other degrees of over-ventilation and even under-ventilation may be employed if desired. The individual flames produced appear as a flowing stream of highly heated glowing gases surrounded by a gaseous envelope of products of combustion, due to particles of carbon liberated within each flame envelope by thermal decomposition of portions of the hydrocarbons. This carbon immediately is rendered incandescent by the heat resulting from the combustion of portions of the combustible gas in contact with the air. Due to the high temperature of the gases as they move through the highly heated throat and heating chamber, and due to a furnace construction insuring the maintenance of a gas stream which does not change abruptly in cross-section throughout at least the major portion of the path thereof within the throat and heating chamber, turbulence of the gas and air is substantially inhibited, thus preventing complete gas intermixture, (which would result in the non-luminous combustion of the hydrocarbons without formation of carbon particles), and permitting the incandescent carbon to persist in the gases undergoing combustion and to effectively radiate large quantities of heat to work over a large portion of its path of travel in the furnace. The luminous flame produced by the incandescent carbon makes possible a rate of heat transfer at least four times as great as that possible from a non-luminous flame under comparable conditions of operation.

After the furnace has been brought up to the temperature required for the heating of the work—as, for example, a temperature of 2200° to 2400° F.,—the work to be heated is moved into the furnace through the opening in the wall 14, the top surface of the work being slightly below the floor of the throat.

The flowing, highly-heated gases, containing a plurality of strata of incandescent carbon, effect a rapid uniform heating of the moving work, the gases thereafter passing into the flue 36 and thence passing through the flue 40 to the stack, after giving up additional heat to the work through the refractory floor of the heat treating chamber.

The lowermost row of tubes in the burner, being in communication with the gas manifold 78, insures the presence of a flowing blanket of hydrocarbon gases covering the work within the chamber 12, thus protecting the work from substantial oxidation and from scaling during the heat treatment.

The burner construction may be suitably modified to vary the thickness of the blanket of fuel gas or other reducing gas acting as a protective covering for the work. In one experiment made in accordance with the present invention 20% of the total fuel gas employed was used for the protective fluid blanket, and it gave effective protection against scaling to steel being heated. An inert or reducing gas atmosphere containing in the neighborhood of 11% carbon monoxide has been found to be highly effective in protecting the work from oxidation for heating periods of as long as 45 minutes; and carbon monoxide percentages of as low as 5% are sufficient to prevent scaling of ¾" steel rods heated to 2250° F. in twelve minutes.

Any slight amount of turbulence occurring within the heating chamber due to fluid flow past the work being removed, is insufficient to materially affect the character of the flame propagation or the effectiveness of the heat-transfer.

It is clearly within the purview of the present invention to substitute for the furnace here described, and which is particularly adapted for the continuous heating of work, other types of furnace construction including those adapted for batch or intermittent heating operations. For example, the work may be introduced into and removed from such a furnace through ports or slots in a side wall or the end wall thereof.

The length of the flames within the furnace may be controlled to uniformly distribute the heat therefrom within the heating chamber and to locate the hottest part of the furnace at the proper distance from the burner to give the most efficient heating operation. For example, the length of the flames can be shortened by increasing the number of tubes and decreasing the diameter thereof while maintaining a given ratio of gas to air volume flowing through the tube assembly, or by sloping the roof at the throat or combustion chamber downward in the direction of travel of the gases. Furthermore, by increasing the degree of over-ventilation, the length of the flames is correspondingly decreased.

The actual efficiency of heat emission by radiation from the incandescent carbon, where a hydrocarbon-containing gas is used, is low from any single sheet of carbon formed adjacent a flame surface. By greatly increasing the extent of these flame-surfaces by increasing the number of the respective ducts, thus securing many streams of incandescent carbon, a very effective emission of radiant energy is obtained. In order to get the greatest amount of carbon per unit of gas burned, the interdiffusion, non-turbulent type of flames here described are necessary. Where the height and/or the width of the heat-treatment chamber and the cross-section thereof vary substantially at different points lengthwise thereof, such variation should be obtained by smooth curves to prevent interference with the stream line non-turbulent flow of the gases passing therethrough.

While gas velocities in the neighborhood of 10 feet per second may be successfully employed in accordance with the invention, higher or lower velocities may be employed. The gas and/or air may, if preferred, be preheated in any suitable manner, as for instance by indirect heat exchange from the flue gases; or the gas and air may be preheated under controlled conditions by the introduction of superheated steam or other hot fluid into the chamber 63 through the conduit 64. When this plan is followed the tubes 55 must not reach a temperature sufficiently high to cause thermal decomposition of the hydrocarbon gas passing therethrough. Within safe limits such preheating will greatly increase the velocity of flame propagation and will stabilize the flame so as to help maintain the desired stream-line flow effect.

A relatively small amount of air may be mixed with the fuel gas, for the purpose of preventing carbon formation within the ends of the tubes 55, should any thermal decomposition of the hydrocarbon gas occur. In such instance the air and gas in the mixture should be present in proportions insufficient to produce or propagate a flame. Such arrangement may render unnecessary the water jacketing of the tubes conveying gas into the furnace.

A small amount of steam may also be introduced in admixture with the fuel gas or the air for the same purpose.

The comparative efficiency of the process as carried out in an apparatus of the type herein described is indicated by the following results obtained in the heat treatment of ¾" steel rods 7' long. The said rods were brought to a temperature of 2250° F. in a furnace embodying the present invention, in a period of 12 minutes, while burning for the purpose 1000 cu. ft. of gas. The same type of furnace equipped with a well-known standard type of mixing burner, required 18 minutes for bringing these rods to a like temperature when burning the same amount of gas. Furthermore, it required but 60% as much gas for bringing these rods to the said temperature in a given length of time in a furnace using the diffusion-flame burner of the type described than was required to bring the rods to that temperature in the same furnace when employing a standard type of mixing burner.

The burner construction of Fig. 3 may be so modified as to have every alternate row of tubes, including the bottom row thereof adapted to introduce gas into the furnace the other tubes feeding air into the furnace. This normally results in a somewhat slower interdiffusion of the gases and a somewhat longer, less intense flame. In order to shorten such flame, the diameter of the ducts may be somewhat reduced to increase the surface area of contact between the air and gas and to reduce the time required for substantial interdiffusion. The velocities of both the gas and air may also be increased to permit a longer path of travel for a given degree of diffusion of the gases, the relative velocities being maintained approximately the same.

By the present invention, a high heating efficiency is obtained together with a uniform heating of the work, while oxidation normally accompanying such heating is greatly reduced, and scale formation is substantially prevented. The invention is obviously adapted also for the heat treatment of materials at much lower temperatures than those usually employed for heating metals. For example, materials may be heated to temperatures as low as 400°–500° F. or lower in accordance with the principle of the invention. The invention is susceptible of modification within the scope of the appended claims.

I claim:

1. In a method of heating by the combustion of fuel gas, the steps comprising simultaneously discharging individually non-turbulent streams of air and said gas, respectively, in a common direction, in contacting relation, at substantially equal velocities and in proportions for substantially complete combustion, and maintaining the stream line flow of said streams after discharge as aforesaid, whereby combustion is substantially dependent upon the interdiffusion of the air and gas at their stream boundaries.

2. In a method of heating by the combustion of fuel gas, the steps comprising simultaneously discharging individually non-turbulent streams of air and said gas, respectively, in a common direction, in contacting relatoin, at substantially equal velocities and in proportions for substantially complete combustion, and maintaining the stream line flow of said streams after discharge as aforesaid, whereby combustion is substantially dependent upon the interdiffusion of the air and gas at their stream boundaries, one or more of said streams being admixed with a diluent for modifying combustion.

3. In a method of heating by the combustion of fuel gas, the steps comprising simultaneously discharging individually non-turbulent streams of air and said gas, respectively, in a common direction, in contacting relation, at substantially equal velocities, and in proportions for substantially complete combustion, and maintaining the stream line flow of said streams after discharge as aforesaid, whereby combustion is substantially dependent upon the interdiffusion of the air and gas at their stream boundaries, the lowermost of said streams being fuel gas.

4. In a method of heating by the combustion of fuel gas, the steps comprising discharging individually non-turbulent streams of air and said gas, respectively, in a common direction, in contacting relation, at substantially equal velocities and in proportions for substantially complete combustion, and maintaining the stream line flow of said streams after discharge as aforesaid, whereby combustion is substantially dependent upon the interdiffusion of the air and gas at their stream boundaries, the streams of gas alternating with the streams of air.

5. In a method of heating by the combustion of fuel gas, the steps comprising simultaneously discharging individually non-turbulent streams of air and said gas, respectively, in a common direction, in contacting relation, and at substantially equal velocities and in proportions for substantially complete combustion, maintaining the stream line flow of said streams after discharge as aforesaid, whereby combustion is substantially dependent upon the interdiffusion of the air and gas at their stream boundaries, and simultaneously flowing along with said streams, a non-turbulent stream of gaseous medium for protecting the material being heated from oxidation or reduction.

6. A method of producing combustion of a gaseous combustible in the presence of a supporter of combustion, comprising simultaously flowing said combustible and supporter of combustion, respectively, in contacting non-turbulent streams, in the same direction and at velocities which are substantially equal, whereby combustion is substantially dependent upon the interdiffusion of said contacting streams.

7. A method of producing combustion of a hydrocarbon gas in the presence of a supporter of combustion, comprising simultaneously flowing said gas and supporter of combustion, respectively, in contacting non-turbulent streams, in the same direction and at velocities which are substantially equal, whereby combustion is substantially dependent upon the interdiffusion of said contacting streams.

8. A method of producing combustion of a gaseous combustible in the presence of a supporter of combustion, comprising simultaneously flowing a plurality of non-turbulent streams of said combustible in the same direction and at velocities which are substantially equal, and simultaneously flowing the supporter of combustion in the same direction as and between said streams, whereby combustion is substantially dependent upon the interdiffusion of the combustible and supporter of combustion.

9. A method of producing an incandescent current of flame within a chamber comprising introducing into said chamber from one end thereof a gaseous stream of substantially the same cross-sectional area as said chamber at said end, said stream being made up of individually substantially non-turbulent streams of air and a hydrocarbon gas, respectively, the air streams alternating with the gas streams and the air being present in sufficient volume to support combustion of said gas.

10. A method of heating material supported on the hearth of a metallurgical furnace, comprising introducing into said furnace at one end thereof a gaseous stream of substantially the same cross-sectional area as the furnace at said end, said stream being made up of individually substantially non-turbulent streams of air and carbonaceous fuel gas, respectively, the air streams alternating with the gas streams and the air being present in sufficient volume to support combustion of said gas.

11. A method of heating material supported on the hearth of a metallurgical furnace, comprising introducing into said furnace at one end thereof a gaseous stream of substantially the same cross-section area as the furnace at said end, said stream being made up of individually substantialy non-turbulent streams of air and carbonaceous fuel gas, respectively, the air streams alternating with the gas streams and the air being present in sufficient volume to support combustion of said gas, and flowing between said material and the first mentioned stream a substantially non-turbulent stream of gaseous medium adapted to protect said material from undesirable gases.

In testimony whereof I affix my signature.

STEPHEN P. BURKE.